Jan. 12, 1960 F. C. PARADISE 2,920,713
SAFETY BUMPER FOR INDUSTRIAL TRUCK
Filed April 22, 1957 2 Sheets-Sheet 1
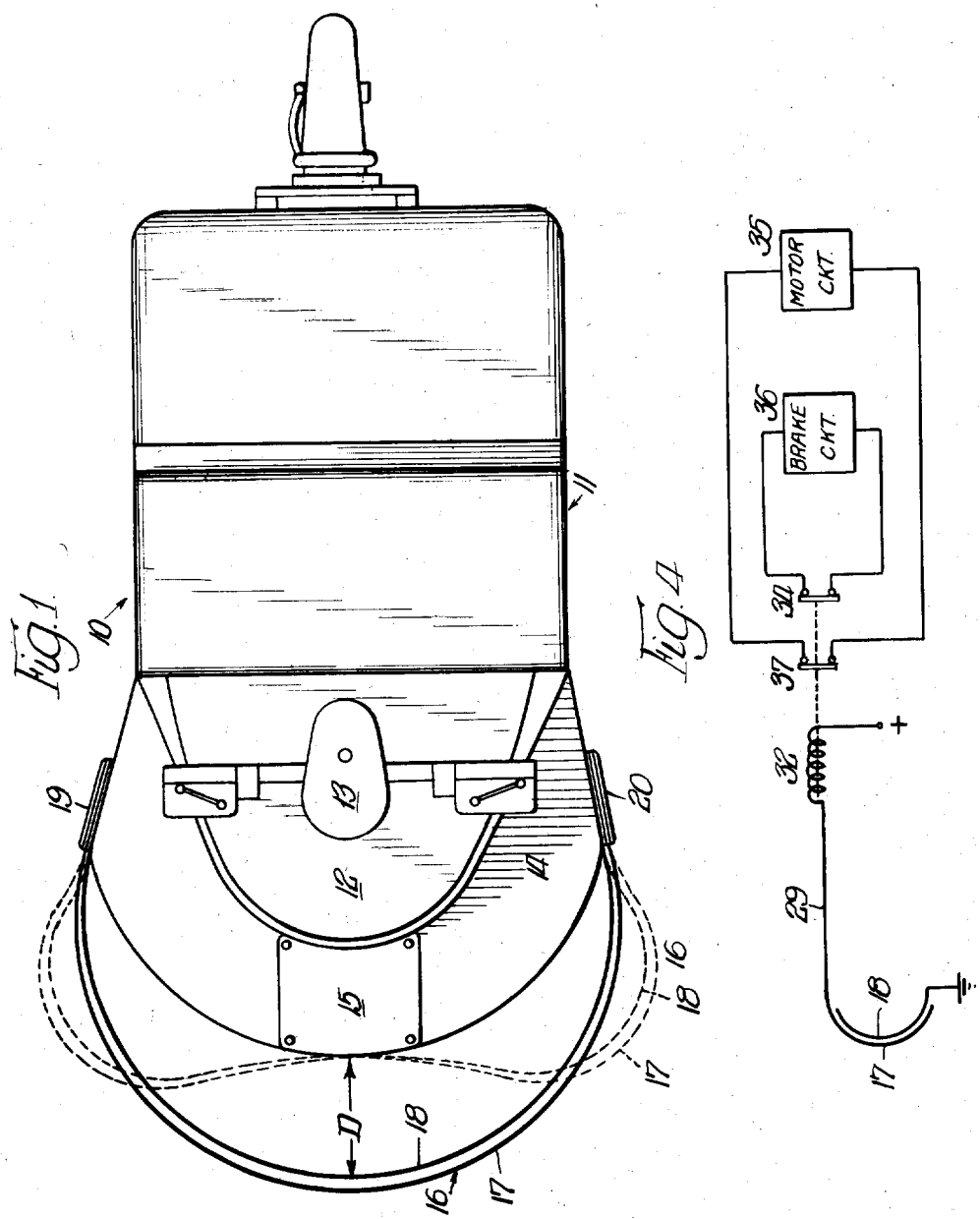
INVENTOR.
Francis C. Paradise,

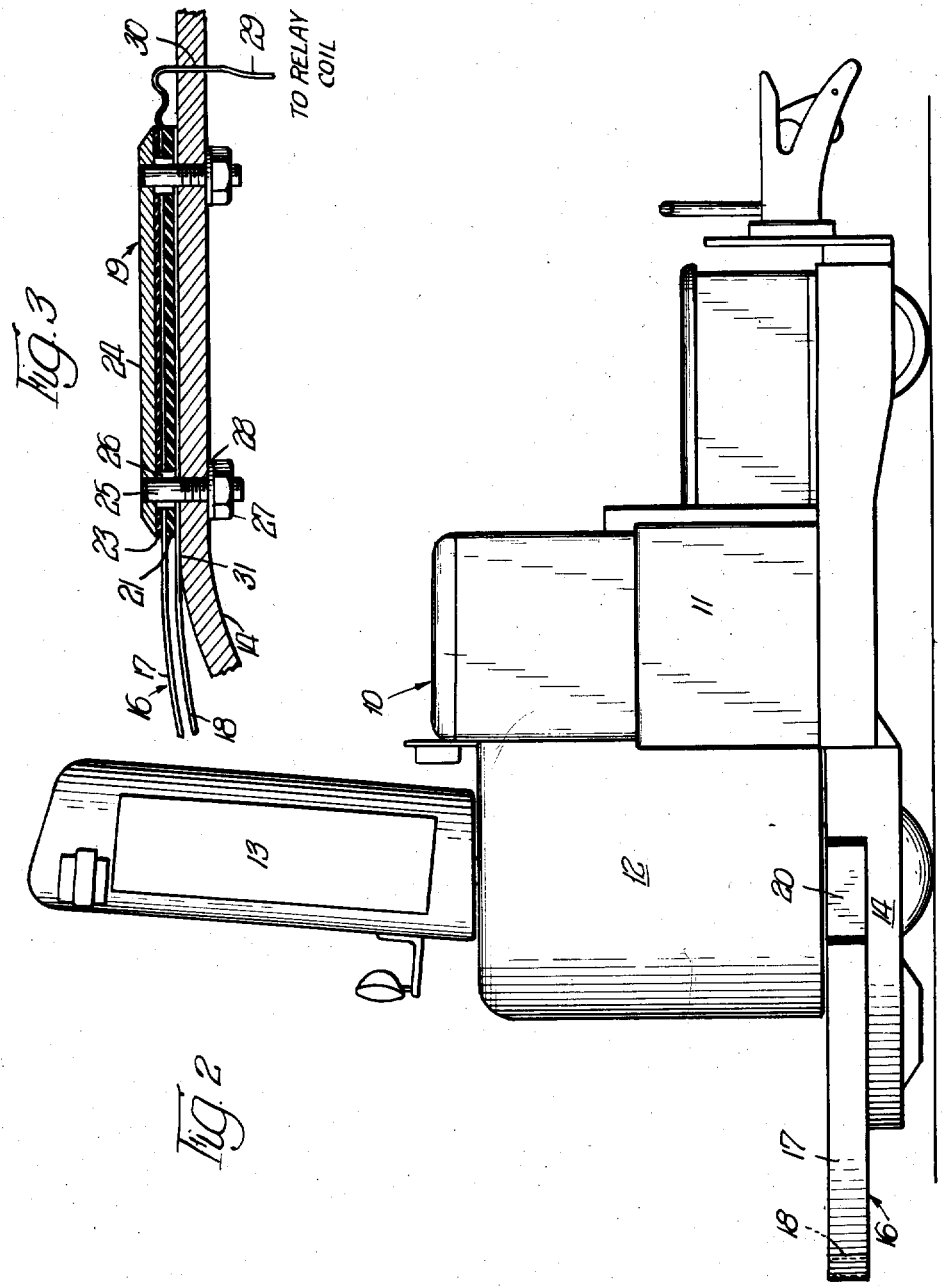

2,920,713

SAFETY BUMPER FOR INDUSTRIAL TRUCK

Francis C. Paradise, Libertyville, Ill., assignor to Barrett-Cravens Company, Northbrook, Ill., a corporation of Illinois Application April 22, 1957, Serial No. 654,242

3 Claims. (Cl. 180—83)

The present invention is directed to a safety bumper for industrial trucks, and more particularly to such means for disabling the propulsion means and applying braking forces to such trucks responsive to contact of the safety bumper with any object.

The use of industrial trucks for the movement of personnel and/or material within manufacturing and storage areas, has long been known. More recently, the propulsion and direction of such industrial vehicles has been accomplished without the guidance and direction of a human operator; see, for example, the copending application of Robert De Liban, entitled "Guidance Systems," filed December 8, 1955, Serial No. 551,770. It is evident that the absence of a human operator exposes a guided industrial truck to certain hazards which the operator would ordinarily observe and avoid by suitable corrective action of the truck. It is similarly apparent that even with the presence of a human operator, a lapse of consciousness or attention can cause the truck to encounter a danger which is ordinarily avoidable. Accordingly, the desirability of automatically stopping an industrial truck, whether controlled by a human operator or remote control means, whenever such trucks encounter an object in its path is manifest.

It is an object of the invention to provide a safety bumper for trucks including an impact-sensitive means, arranged to effect de-energization of the vehicle propulsion means and application of braking forces to the vehicle in response to displacement of the impact-sensitive means.

In accordance with the invention, a safety device for a vehicle may comprise propulsion means and braking means for the vehicle. Control means are provided for de-energizing the propulsion means and for effecting the application of braking forces to halt the vehicle. An impact-responsive actuator means is connected to actuate the control means in response to its displacement by engagement with an obstacle in the vehicle path.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

Figure 1 is a plan view of an embodiment of the invention;

Figure 2 is a side view of the embodiment illustrated in Figure 1;

Figure 3 is a detail view of a portion of the structure shown in Figures 1 and 2; and Figure 4 is a schematic view, partly in block form, of a control system adaptable for use with the inventive structure.

Figures 1 and 2 are general illustrations of a truck 10, having a main body portion 11 and a front portion 12, which is arranged to receive the steering column 13. A "cow-catcher" member 14 extends beneath and forwardly of front portion 12. A platform member 15 is disposed between the "cow-catcher" member 14 and front portion 12.

In accordance with the invention, a safety bumper 16 is secured to "cow-catcher" 14, and extends forwardly from such member. The safety bumper 16 in the illustrated embodiment comprises a pair of current conducting members 17 and 18, of material such as brass, bronze, or steel, for example; members 17 and 18 are generally semi-circular in configuration, and are secured to cow-catcher member 14 by means of assemblies 19 and 20.

Figure 3 shows in greater detail the method of fastening the safety bumper to the cow-catcher member. As shown thereat, disposed outwardly from the cow-catcher member 14 are the following structural pieces (in sequence): current conducting member 18, a first insulating spacer 21, current conducting member 17, a second insulating member 23, and an outer protective member 24 which may be of the same material as the cow-catcher member 14.

A pair of similar bolts 25 are utilized to affix assembly 19 to cow-catcher member 14. The other ends of bolts 25 (the upper portions as shown in Figure 3) may be secured in the protective metallic member 24 by a press fit or other means. Bolts 25 contact insulating bushings 26, which protect the bolt members from contact with the outer member 17. Each of the bolts, however, does contact both inner member 18 and cow-catcher member 14. A pair of nuts 27 are screwed over washers 28 on the inward ends (lower portions as shown in Figure 3), to position and hold the assembly 19 adjacent the cow-catcher member 14. An insulated cable 29 is connected to the outer member 17 by soldering or other suitable means, and passes through a channel 30 in the cow-catcher member 14 for connection to a relay member, to be described more fully hereinafter. At the point designated by reference numeral 31, the paint may be removed from the surface of cow-catcher member 14 which contacts member 18 to insure a good electrical contact therebetween. Accordingly the inner member 18 is at the same electrical potential as is cow-catcher member 14; although not shown in Figure 3, cow-catcher member 14 is at ground potential with reference to the electrical system of truck 10.

It will be appreciated that the potentials applied to members 17 and 18 may be varied from those described in connection with the illustrated embodiment of the invention. For example, member 17 may be maintained at ground potential and a different potential applied to member 18. Alternatively, members 17 and 18 may be maintained at reference potentials other than ground potential.

Further in accordance with the invention, members 17 and 18 are disposed about one inch apart, so that an impact upon the outer member 17 will displace same inwardly to contact member 18. As shown in the embodiment of Figure 4, when the outer member 17 is displaced to contact inner member 18 (which is connected to ground), ground potential is extended from inner member 18 over outer member 17, along insulated cable 29, to a relay coil 32, the other end of which is connected to a point of operating potential. When the inner and outer members 18 and 17 are moved into contact, relay 32 operates and opens contacts 37 and 34. As shown only generally in Figure 4, contacts 37 are effective in their opening to open the motor circuit 35 and thereby disable the propulsion means of truck 10. The opening of contacts 34 is effective to open brake circuit 36 and effect application of braking forces to bring the truck 10 to an immediate halt. The motor and brake circuits are not shown in detail, because such connection and operation is obvious to those skilled in the art. The normally closed contacts 37, for example, may be positioned in a control circuit as are contacts 37 in the copending application of Arthur M. Barrett, Jr., entitled "Control System," filed March 4, 1957, Serial No. 643,819, which is assigned to assignee of this invention. It is apparent from the disclosure of the last-mentioned copending application that the opening of contacts 37 in Figure 1 of that application is effective to de-energize the propulsion means of an associated industrial truck, and that such contact opening also effects dynamic braking of the truck.

In Figure 4 of the present application, the opening of contacts 34 may be utilized to break a normally energized circuit and effect the application of mechanical braking forces to the truck or other controlled vehicle. Such a normally energized circuit arrangement is often used, for example, in a "dead-man's brake" arrangement, where the operator of a manually controlled truck normally depresses a pedal (not shown) or depresses a movable seating member (not shown) by his own weight to maintain contacts such as contacts 34 in the closed position. Alternatively, contacts 34 may be arranged to be normally open and, responsive to their closure by the operation of relay 32, to complete a path within brake circuit 36 to operate associated equipment and thus effect application of braking forces to the truck. If desired, contacts such as 37 and 34 may be arranged to actuate audible and/or visual alarms to give notification that the truck has encountered an obstacle, or contacts may be arranged to effect other control or signalling operations. Other modifications and alterations of the motor and braking circuits, and the operation thereof, will be apparent to those skilled in the art.

The novel safety bumper of the invention may be positioned at the rear as well as on the forward end of the truck. A rear-mounted safety bumper arrangement may be utilized, for example, to halt the truck when the truck is backed up to a trailer to complete a hitch and, whether through human or mechanical error, misses the trailer coupler. Such an arrangement reduces wear and minimizes servicing of equipment caused by rear end collisions in hitching operations.

The high degree of protection afforded both to personnel and to equipment by practice of the invention is apparent when it is noted that a truck utilizing the safety bumper of the invention can be stopped in a distance less than the distance between the front of the truck and the rear of conductive member 18. To insure such complete and safe halting of the truck within a predetermined distance, empirical methods may be employed to determine the mass, maximum velocity, and braking forces of the truck. From these quantities the distance required to stop the vehicle is determined. After the stopping distance is ascertained, the safety bumper is disposed so that the inner member 18 is spaced from the front portions of cow-catcher member 14 and platform member 15 by a distance D (Fig. 1), where distance D exceeds the stopping distance of the truck.

Thus, when a truck utilizing the embodiment of the invention illustrated in the drawings is travelling forwardly and strikes an object, the outer conductive member 17 is displaced inwardly into contact with member 18, thereby completing an energizing path for relay 32. Relay 32 operates and opens contacts 37 and 34, which in turn effects the de-energization of the propulsion means and application of braking forces to the truck. The truck is swiftly halted, as the safety bumper 16 is deflected toward the position shown in dashed lines in Figure 1. Although the safety bumper is deflected substantially as shown in Figure 1, in practice the inner member 18 is not deflected through a distance sufficient to permit engagement of the central portion of the bumper with the front of the truck, because the truck stopping distance is less than distance D. Accordingly the members 17 and 18 are only partially deflected, and there is no wear upon the inner surface of member 18 such as would occur if the safety bumper were always deformed, responsive to striking an object, until the inner member engaged the truck.

It is manifest that the novel safety bumper disclosed and claimed in this application affords a substantial margin of safety to personnel and property in the vicinity of operating vehicles which are equipped with the invention. The invention is simple and economical to manufacture, having few parts, and may be easily incorporated into the control systems of present trucks as well as added to the construction of new trucks. The measure of safety and protection realized is so great that the possibility of collision is virtually eliminated by use of the inventive safety bumper.

Although only a particular embodiment of the various aspects of the invention has been shown and described, it is apparent that modifications and alterations may be made, and it is intended in the appended claims to cover all such modifications and alterations as may fall within the true spirit and scope of the invention.

What is claimed is:

1. In an industrial truck or the like having brake means for stopping the truck in a given distance under normal operating conditions, a control circuit for the brake means including a pair of contacts, and bumper means on the truck for actuating the contacts and completing the control circuit upon encountering an obstruction, the improvement comprising a deflectable safety bumper projecting beyond the end of the truck, said bumper comprising a pair of electrically conductive flexible bands constituting the said contacts of the control circuit, said bands normally being spaced a short distance apart and the inner one thereof having a spacing from the end of the truck at least substantially equal to the said given stopping distance of the truck, the outer one of said bands being initially deflectable into engagement with the inner one of said bands upon encountering an obstruction for completing the control circuit and both of said bands subsequently being conjointly deflectable through such part of said distance as the truck may thereafter travel, said bands being flexible for completing the circuit and deflecting conjointly substantially irrespective of which portion of the outer band encounters the obstruction and the direction in which the encounter occurs.

2. In an industrial truck as set forth in claim 1 and including a propelling motor, said control circuit including means responsive to completion of the circuit upon engagement of said bands for deactivating the motor and activating the brake means to stop the truck in a short distance.

3. In an industrial truck or the like having brake means for stopping the truck in a given distance under normal operating conditions, a normally open control circuit for the brake means including a pair of spaced contacts, and bumper means on the truck for closing the contacts and the control circuit upon encountering an obstruction, the improvement comprising a deflectable safety bumper projecting beyond the end of the truck a distance at least substantially equal to the said given stopping distance of the truck, said bumper comprising a pair of concentrically bowed current conducting flexible bands secured at their ends to opposite sides of the truck adjacent one end thereof, said bands normally being disposed in spaced insulated relation and constituting the said contacts of the control circuit, the mid-portion of the inner one of said bands being freely spaced from the one end of the truck by said distance, the outer one of said bands upon engagement with an obstruction being initially deflectable into engagement with the inner band for closing the control circuit and applying the brake means, and said bands thereafter being conjointly deflectable through such part of said distance as the truck may travel before being stopped by the brake means.

References Cited in the file of this patent

UNITED STATES PATENTS

| | | |
|---|---|---|
| 1,658,574 | Schauman et al. | Feb. 7, 1928 |
| 1,669,536 | Schauman et al. | May 15, 1928 |
| 1,811,484 | Westlund | June 23, 1931 |
| 1,823,950 | Mechetti | Sept. 22, 1931 |
| 2,282,201 | Neuman | May 5, 1942 |
| 2,588,815 | Fasolino | Mar. 11, 1952 |